United States Patent
Coughlan et al.

(10) Patent No.: US 7,734,034 B1
(45) Date of Patent: Jun. 8, 2010

(54) REMOTE PARTY SPEAKER PHONE DETECTION

(75) Inventors: Marc William Joseph Coughlan, Sydney (AU); Alexander Quentin Forbes, Westleigh (AU); Peter D. Runcie, Bilgola Plateau (AU); Alexander Martin Scholte, Chatswood (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 1337 days.

(21) Appl. No.: 11/197,632

(22) Filed: Aug. 3, 2005

Related U.S. Application Data

(60) Provisional application No. 60/692,873, filed on Jun. 21, 2005.

(51) Int. Cl.
H04B 15/00 (2006.01)

(52) U.S. Cl. .................. 379/388.07; 379/390.04; 379/391

(58) Field of Classification Search .......... 379/3, 379/78, 93.37, 99, 345, 357.03, 388.02, 388.07, 379/390.04, 391, 392, 402, 406.01, 406.05, 379/406.09, 410, 420, 420.02, 388.01, 406.08
See application file for complete search history.

(56) References Cited

U.S. PATENT DOCUMENTS

| | | | |
|---|---|---|---|
| 3,784,747 A | 1/1974 | Berkley et al. | |
| 3,786,188 A | 1/1974 | Allen | |
| 4,131,760 A | 12/1978 | Christensen et al. | |
| 4,272,990 A | 6/1981 | Hiemann et al. | |
| 5,570,423 A | 10/1996 | Walker et al. | |
| 5,577,116 A | 11/1996 | Townsend et al. | |
| 5,646,990 A * | 7/1997 | Li | 379/406.08 |
| 5,737,410 A | 4/1998 | Vahatalo et al. | |
| 5,796,791 A | 8/1998 | Polcyn | |
| 5,799,278 A | 8/1998 | Cobbett et al. | |
| 5,842,165 A | 11/1998 | Raman et al. | |
| 5,909,384 A | 6/1999 | NirTal et al. | |

(Continued)

FOREIGN PATENT DOCUMENTS

DE 2215402 9/1973

(Continued)

OTHER PUBLICATIONS

U.S. Appl. No. 10/152,716, filed May 2002, Boland.

(Continued)

*Primary Examiner*—Fan Tsang
*Assistant Examiner*—Akelaw A Teshale
(74) *Attorney, Agent, or Firm*—Sheridan Ross P.C.

(57) ABSTRACT

A system and method are provided for detecting acoustic echo in a telecommunications transmission. Detected acoustic echo is analyzed to determine if the acoustic echo includes characteristics indicative of use of a speakerphone by a remote party. Specific characteristics analyzed include the presence of multiple bulk delay values, echo magnitude, and the length of time for echo delays present within the telecommunications system. If the detected acoustic echo falls outside the range of acceptable parameters, or otherwise exceeds threshold limits, a warning signal is transmitted to the user indicating a high likelihood that the remote party is using a speakerphone. Warning the user of speakerphone use by the remote party can be helpful in ensuring that the communications between the parties is maintained in confidence.

22 Claims, 2 Drawing Sheets

U.S. PATENT DOCUMENTS

| | | | |
|---|---|---|---|
| 5,933,808 | A | 8/1999 | Kang et al. |
| 5,970,137 | A | 10/1999 | Le Damany et al. |
| 5,970,154 | A | 10/1999 | Chen et al. |
| 5,999,901 | A | 12/1999 | Knittle et al. |
| 6,097,791 | A | 8/2000 | Ladd et al. |
| 6,256,384 | B1 | 7/2001 | Trump |
| 6,324,262 | B1 | 11/2001 | Tuttle |
| 6,507,653 | B1 | 1/2003 | Romesburg |
| 6,654,463 | B1 | 11/2003 | Leonidov et al. |
| 6,687,372 | B1 | 2/2004 | Trump et al. |
| 6,771,701 | B1 | 8/2004 | Klindworth et al. |
| 7,221,659 | B1 * | 5/2007 | Surazski et al. ............. 370/286 |
| 7,224,794 | B1 * | 5/2007 | Davis et al. ............ 379/388.01 |
| 2003/0138117 | A1 | 7/2003 | Goff |

FOREIGN PATENT DOCUMENTS

EP  0092035  10/1983

OTHER PUBLICATIONS

U.S. Appl. No. 10/153,106, filed May 2002, Boland.

T. Yensen et al., "Echo Target Determination Using Acoustic Round Trip Delay for Voice Over IP Conferences", IEEE 0-7803-5471-0/99, pp. IV-348-IV351, 1999.

ITU-T P-Series Recommendation P.562 "Series P: Telephone Transmission Quality, Telephone Installations, Local Line Networks", May 2000.

ITU-T Recommendation P.561 "Telephone Transmission Quality Objective Measuring Apparatus", Feb. 1996.

ITU-T Recommendation COM 12-10-E, Study Group 12—Contribution 10, Nov. 2000.

ITU-T P-Series Recommendation P.862 "Series P: Telephone Transmission Quality, Telephone Installations, Local Line Networks", Feb. 2001.

Rix et al., "PESQ—The New ITU Standard for End-to-End Speech Quality Assessment", AES $109^{th}$ Convention, Sep. 22-25, 2000.

Rix, et al., "The Perceptual Analysis Measurement System for Robust End-to-End Speech Quality Assessment", IEEE, 2000.

"Draft New Recommendation P.862: Perceptual Evaluation of Speech Quality (PESQ), An objective Method for End-to-End Speech Quality Assessment of Narrow-Band Telephone Networks and Speech CODECS", COM 12-5-E, ITU Telecommunication Standard Sector, November 2000, pp. 1-23.

"Voice Activity Detection", Answers.com website, as early as 2005, available at http://www.answers.com/main/ntquery?tname=voice%2Dactivity%2Ddetection&print=true, printed on May 19, 2005, p. 1.

* cited by examiner

REMOTE PARTY SPEAKER PHONE DETECTION

CROSS REFERENCE TO RELATED APPLICATIONS

The present application claims priority from U.S. Provisional Patent Application Ser. No. 60/692,873, filed on Jun. 21, 2005, entitled "REMOTE PARTY SPEAKER PHONE DETECTION," the entire disclosure of which is hereby incorporated by reference herein in its entirety.

FIELD OF THE INVENTION

The present invention is directed to providing an indication of the presence of an acoustic echo in a communication signal. In particular, the present invention relates to providing a warning signal to a user of a telecommunication device that a remote party is using a speakerphone, the warning being prompted by the presence of an acoustic echo in the telephone communication generated by the remote party.

BACKGROUND OF THE INVENTION

Voice communication systems, including telephone systems, are subject to several sources of echo that make transmitted voice signals distorted, and thus unacceptable to listeners. Echoes can noticeably degrade the intelligibility and quality of a transmitted voice signal. Echoes associated with acoustic reverberation are particularly evident in connection with use of speakerphones. It is most often the case that users speaking into a speakerphone within small enclosed environments, such as offices or conference rooms, are unaware of the presence of such echoes.

One source of echo is simple acoustic reverberation generated at the user's physical location. For example, if the user employs a speakerphone, the user's voice may reflect off the surrounding environmental structure, such as the walls and ceiling. The reflected sound waves result in a plurality of random acoustic paths that are received by the microphone of the speakerphone. These random and time separated acoustic paths create echoes.

Another source of echo is acoustic feedback that may be created by use of a speakerphone by a remote party. Acoustic feedback originates as a voice signal generated by the user and transmitted to a remote party's location. The received voice signal is broadcast by the speaker in the remote party's speakerphone, the broadcasted voice signal reflects off the enclosed area and is picked up by the microphone of the speakerphone. The reflected voice signal is then transmitted back to the user as acoustic feedback.

Other echoes within a telecommunication system may result from hybrid unbalanced conditions within the particular communication hardware used in the communication system. More specifically for hybrid echoes, these often result from mismatches of impedances on PSTN networks.

Whether an echo is perceptible to a user is generally determined by the signal level of the echo, and the time offset or delay of the echo relative to the time in which the original signal is generated. The problem of echoes in voice communications is further aggravated by the use of packet data networks because packet data networks cause an increase in transmission delay times thereby making echoes more easily perceptible to users.

Attempts have been made to reduce echo in voice communications by the use of signal processing techniques to compensate for or remove the echoes. Generally, such techniques require the deployment of an echo canceller, a device combining hardware and firmware to achieve the signal processing. Such echo cancellers typically run on a digital signal processor that are programmed to sense echoes in voice signals and then to alter the voice signals to compensate for the presence of echoes.

With the advent of new telephony transmission protocols, echoes with increased or longer delays now reside over many communication networks. Cancellation of echoes is achieved in some echo cancellers by providing an estimate of the bulk echo delay that includes measurement by the echo canceller of the length of time of a particular echo delay as well as the magnitude of the echo. A number of telephony devices may include echo cancellation capability to include voice over IP phones, voice over IP media gateways, and PSTN gateways.

For telephone communications, there may be a need for confidentiality where one or both of the parties to a conversation may only wish for their conversation to be heard by the other party. For these types of confidential communications, it is undesirable to use a speakerphone since the relatively powerful speaker of the speakerphone may allow other parties to hear the conversation. Depending upon the particular location where and how a speakerphone is employed, a user may not know whether the remote party is using a speakerphone. Some acoustic echo is perceptible by a user, but not all. Thus, the user has no reliable way of knowing whether the remote party is using a speakerphone particularly when the user can perceive no echo. Even if the user requests the remote party to not use a speakerphone, the user has no reliable way of confirming whether the remote party has complied with the request.

Therefore, there is a need for providing an indication to a user of a telecommunication device as to the use of a speakerphone by a remote party. While echo detection and remediation is known in the use of echo cancellers, these echo cancellers do not provide a signal to the user indicating the presence of an echo, much less discriminating hybrid echo from acoustic echo for purposes of providing the signal to the user indicating the presence of a speakerphone.

SUMMARY OF THE INVENTION

In accordance with the present invention, a system and method are provided for detecting echo in a telecommunications transmission, discriminating between hybrid and acoustic echo, and then providing an output to the user indicating that the particular nature of the acoustic echo strongly indicates the possibility that the remote party is using a speakerphone.

In accordance with one preferred embodiment of the present invention, an echo detector is provided as part of a telecommunication system wherein a transmitted voice signal is analyzed for presence of echo. The echo detector may also have the capability to condition the voice signal to remove or remediate echo in the transmitted signal, and therefore may also be referred to as an echo canceller. An echo discriminator is also provided within the telecommunication system for discriminating between hybrid echo and acoustic echo. The echo discriminator analyzes attributes of acoustic echo that may be present to determine whether the acoustic echo is potentially created by a remote party's use of a speakerphone. The echo discriminator may apply an algorithm to make a determination whether existing acoustic echo should trigger an output sent to the user warning the user that the remote party is using a speakerphone. The attributes or characteristics of the acoustic echo analyzed include an evaluation of the bulk delay values, that is, the time delay between transmitting a signal from the user and the echo of the signal returning to the user. The presence of multiple bulk delay values, as opposed to a consistent pattern of bulk delay values, indicates the presence of multiple acoustic paths. The existence of multiple acoustic paths in a signal is generally characteristic of signals created by a remote party using a speakerphone. Other attributes that may be analyzed include the decibel level or magnitude of the acoustic echo, as well as a comparison of bulk delay values. Delays caused by acoustic echo are typically much greater than delays caused by hybrid echo. Also, the magnitude of acoustic echoes is typically higher than hybrid echoes. Accordingly, threshold values can be determined for both the magnitude of an echo as well as the delay time of an echo for triggering an output warning to the user.

Threshold values for triggering an output can be further refined by establishing a dynamic adjustment of the threshold values on a per call or group call basis. More particularly, the switch or gateway within the communication system could maintain data concerning the echo characteristics for a particular trunk based on the history of the trunk. This data could include typical bulk delay and magnitude information averaged over time for a particular trunk. This stored data could be made available to the echo discriminator, and then be used to adjust the threshold values that trigger the output. For example, during a particular call, the stored data could be used as an adjustment factor for the hybrid echo. Thus, the threshold values triggering the warning may represent a more accurate prediction as to the existence of speakerphone use.

Additional data that could be used as auxiliary inputs to the echo discriminator to fine tune the threshold values for triggering a warning could include data inputs generated by a voice activity detection (VAD) module incorporated in each particular phone. VAD generally refers to use of an algorithm in speech processing where the presence or absence of human speech is detected from audio samples. VAD can also be used to indicate whether the speech is voiced, unvoiced, sustained, or early. VAD functionality can also be incorporated within a communications server to process selected signals across the communications network. The specific outputs from a VAD module that can be used to fine tune threshold values include an estimate of the level noise floor (the level of sound with no voice signal from a speaker), and an indication whether a voice signal is present (sound other than background noise).

If the echo discriminator determines that there is a suspect acoustic echo in a transmitted signal an output in the form of a warning signal is sent to the user, signifying the possibility of speakerphone use by the remote party. The warning signal may include a visual indication, an audible indication, or a combination of both. For example, a visual indication could be provided on the user's voice terminal in a form of a light, a text message on a scrolling display, or some other visual identifier incorporated on the user's voice terminal. The audible signal could include a beeping tone sent to the user's voice terminal or a prerecorded message.

The device employed as the echo discriminator can generally be considered a combination of hardware and firmware, and the echo discriminator device may be installed at a number of locations within a telecommunications network to include incorporating the discriminator at the desired voice terminal, within a telephony switch, a gateway, or within a communications server. Regardless of the physical location of the discriminator, it communicates with the echo detector/canceller to retrieve signal data from the echo detector/canceller that detects the presence of echoes.

Additional features and advantages of the invention will become apparent from a review of the drawings, taken in conjunction with the following detailed description.

DETAILED DESCRIPTION OF THE INVENTION

Figure 1:
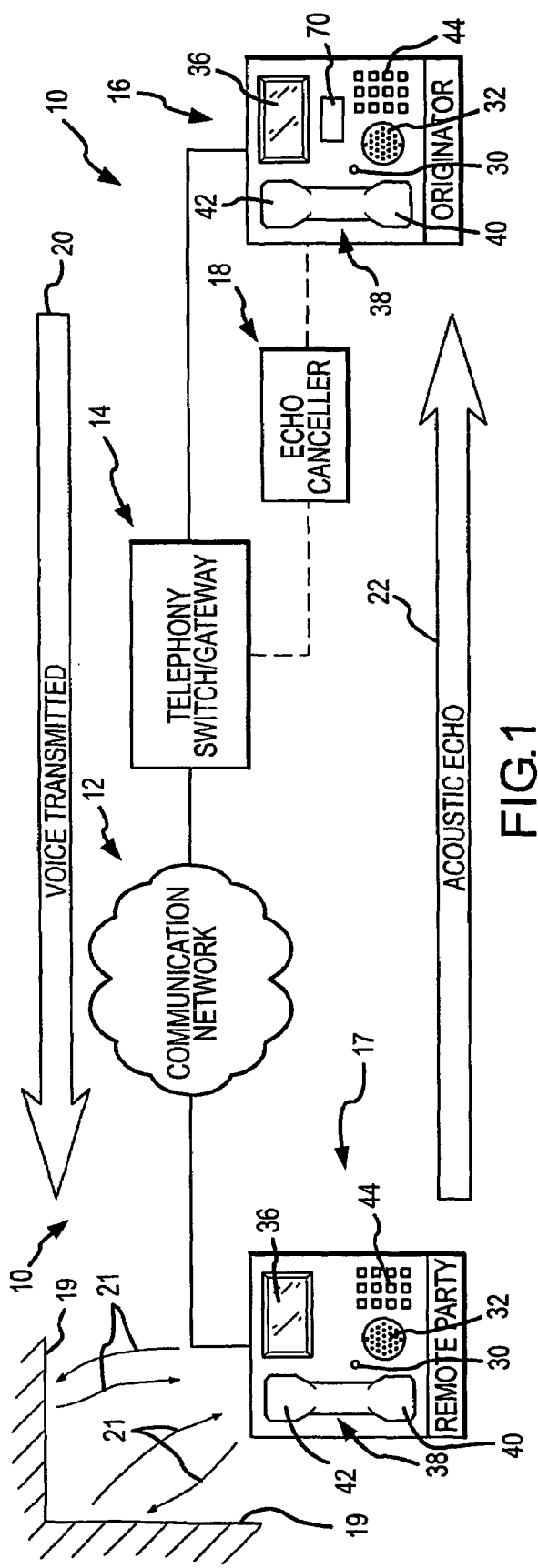
FIG. 1 is a schematic diagram depicting a telecommunication system including an echo detector for detecting echoes associated with voice signals transmitted through the system.

In FIG. 1, a communication system 100 suitable for use in connection with a preferred embodiment of the invention is depicted. In general, the communication system 100 includes a communication network 12, a first communication device 16, and a second communication device 17. The communication network may comprise one or more networks of various types. For example, the communication network 12 may comprise a public switched telephone network. In accordance with another embodiment of the present invention, the communication network 12 may comprise a packet data network over which voice communications are transmitted in accordance with a voice over Internet protocol (VoIP). The communication devices 16, 17 may comprise any type of communication device suitable for use in connection with voice communications. For example, communication devices 16, 17 may include telephones, VoIP telephones, soft VoIP telephones, and wireless voice communication devices. As discussed further below, the particular depictions of the communication devices 16 and 17 are illustrated as being speakerphones. The particular communication network 12 shown in FIG. 1 includes a telephony switch/gateway 14 that enables direct communications between the communication devices 16 and 17.

The communication devices 16, 17 as set forth above, are depicted as conventional speakerphones. Speakerphones may be generally characterized as including a far talk microphone 30 configured for receiving voice signals generated by the user who speaks into the microphone. A broadcast speaker 32 is generally configured for providing an audible output of the received communication signal sent by the remote party. A handset 38 also includes its own separate microphone 40 and speaker 42. The keypad 44 may include the desired arrangement of numeric and/or textual keys wherein the user may input commands or functions through the keypad to control functioning of the speakerphone. The display 36 may include a numeric display, bar graph, colored and/or labeled indicator lights, or a configurable display comprising, for example, a cathode ray tube (CRT) or a liquid crystal display (LCD). As also can be appreciated, the functions of keypad 44 and display 36 can be combined, for example, in the form of a touch screen.

A voice communication transmitted by the user/originator from the first communication device 16 will be received by the remote party at the second communication device 17 as a distorted version of the original voice communication. The voice transmitted is shown generally by arrow 20. In particular, the voice communication 20 may be delayed in time, and distortion may be introduced by components of the system 12 and 14. Furthermore, acoustic reverberations in the communication devices 16 and 17 may create echoes in the transmission of voice communication between the communication devices. An acoustic echo may be introduced into the voice transmitted 20 if the user of the device 16 utilizes a speakerphone, and further acoustic echoes may be introduced if the remote party using device 17 also utilizes a speakerphone. For example, the voice transmitted 20 would be broadcast by speaker 32, the broadcasted voice 20 of the remote party's location would reflect off the surrounding environment 19 and be retransmitted back to the user of the device 16. The environment 19 is depicted as a surrounding room having a wall and ceiling. Arrows 21 depict sound waves broadcast by the speaker 32 and reflected by the environment 19 back to the speakerphone. The retransmitted voice signal is depicted as acoustic echo 22.

As mentioned above, other forms of echo may be introduced to include unbalanced conditions at interconnections between components of the system. Additionally, switching and transmission delays introduced by the communication network can make echoes even more apparent within the system. Transmission delays can be especially problematic in connection with communication networks that utilize voice over Internet protocol transmission techniques. For purposes of the present invention, hybrid echo will be collectively defined as all of the echoes introduced by the communication system that are not attributed directly to acoustic echo introduced into the system by users of the communication devices 16 and 17.

Figure 2:
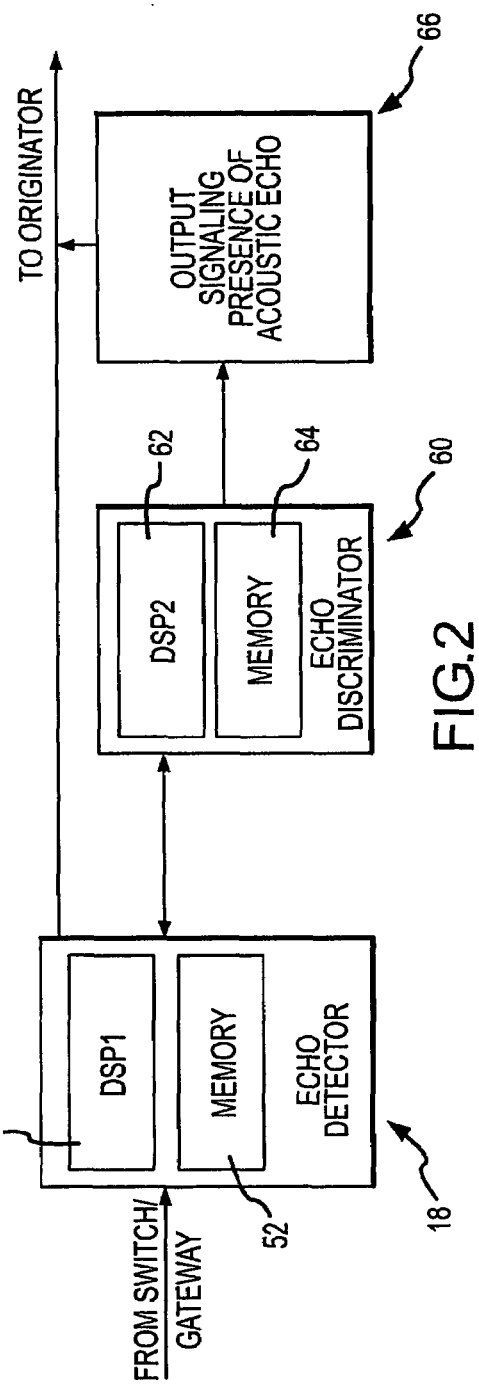
FIG. 2 is schematic diagram depicting an echo discriminator of the present invention incorporated within the telecommunication system.

Now referring to FIG. 2, the echo detector 18 is described in more detail along with an echo discriminator 60, the echo detector and echo discriminator forming integral parts of a preferred embodiment of the present invention. Referring first to the echo detector 18, it is depicted as being a device separate from the communication device 16, for example, the echo detector could be incorporated within a communication server or a switch, or could even be co-located within the telephony switch/gateway 14. As a further example, the echo detector 18 may comprise a computer terminal, such as a computer terminal provided in connection with a communication device comprising a soft or Internet protocol telephone. However, it shall be understood that the echo detector 18 could be incorporated within the communication device 16.

The echo detector 18 would typically include a digital signal processor 50. Memory 52 may be used to store programming code that runs on the processor 50 to perform echo detection. In accordance with another form of the echo detector 18, the processor 50 and memory 52 may be implemented as part of a single integrated circuit, including a controller.

The echo detector 18 analyzes a voice signal received from the microphone 30 of the communication device 16. For example, the echo detector 18 may interpret an outgoing digital representation of a voice signal received from the microphone 30 of device 16, wherein the processor 50 functions to detect rippling in the spectral content of the received signal. Alternatively, the processor 50 may determine the presence of echoes in the signal directly. The processor 50 may also determine the magnitude of echoes detected in the voice signal. As also can be appreciated, the echo detector 18 may additionally comprise an analog-to-digital converter where an analog signal is received from the microphone 30.

The echo detector 18 may also analyze voice signals from an incoming component or portion of the same voice communication generated by the user. More specifically, the echo detector 18 may monitor incoming portions of the transmitted signal that are returning to the user in the form of acoustic echo 22 which is created by the remote's party use of speakerphone 17. The echo detector 18 also has the capability to detect the magnitude of a detected echo, which may be measured by amplitude or power, as well as the amount of time by which each echo component has shifted with respect to the reference signal. In the event that the remote party is using a speakerphone, there is a high probability that a plurality of acoustic echoes will be present, each having different bulk delay values. Utilizing the programming features adopted for the particular echo detector 18, the echo detector 18 would record the various forms of echo present, and may further characterize the cumulative effect of all echo sources. If the detector has remediation capability, then the voice signal transmitted is conditioned to eliminate the echo present. In the case of signal conditioning, as mentioned above, the detector can be further described as an echo canceller.

For additional disclosure information regarding the operation of an echo canceller that may be adopted in the present invention, reference is made to the U.S. patent application Ser. No. 10/280,801, filed on Oct. 25, 2002, and assigned to the Assignee of the present application, the entire disclosure of which is hereby incorporated by reference.

With further reference to FIG. 2, an echo discriminator 60 is provided in communication with the echo detector 18. The echo discriminator may include its own digital signal processor 62 and its own memory 64. Like the digital signal processor and memory within the echo detector 18, the memory 64 may be used to store programming code that is run on the processor 62 to perform echo discrimination to isolate or segregate those portions or parts of detected echo which are most likely attributed to use of a speakerphone by the remote party. Additionally, it shall be understood that the echo discriminator 60, and in particular the processor 62 and memory 64 may be implemented as part of a single integrated circuit, including a controller. Furthermore, it shall be understood that the functionality achieved by the echo discriminator 60 can be directly incorporated within the echo detector 18. More specifically, the functions of isolating/discriminating the particular parts of the echo in order to generate an output signal 66 to the user warning of the presence of a speakerphone may be incorporated within the echo detector 18. Thus, the echo detector 18 could serve a dual purpose in not only detecting detector echo, but also in providing a discriminatory analysis of types of echo detected for purposes of generating the warning signal 66 to the user. Obviously for existing telephone networks, it may be more economical to employ the echo discriminator 60 as a stand-alone device if echo detection/cancellation is already available in the network.

Based upon the characteristics of the acoustic echo that are sorted by the echo discriminator 60, an output signal 66 is generated by the echo discriminator and transmitted to the user signaling the likely use of a speakerphone by the remote party. The signal 66 may result in a visual, audible, or both a visual and audible indication to the user. Further, the signal 66 may result in a numerical output for communicating the magnitude of the acoustic echoes, as well as the average time delay of the acoustic echoes. For example, as shown in FIG. 1, the communication device 16 may include a warning light 70 or other visual indicators that would be energized once the signal 66 was received by the device 16. For an audible warning signal, it could be broadcast through speaker 30. Alternatively, the warning signal could result in the production of a textual message appearing in the display 36.

Figure 3:
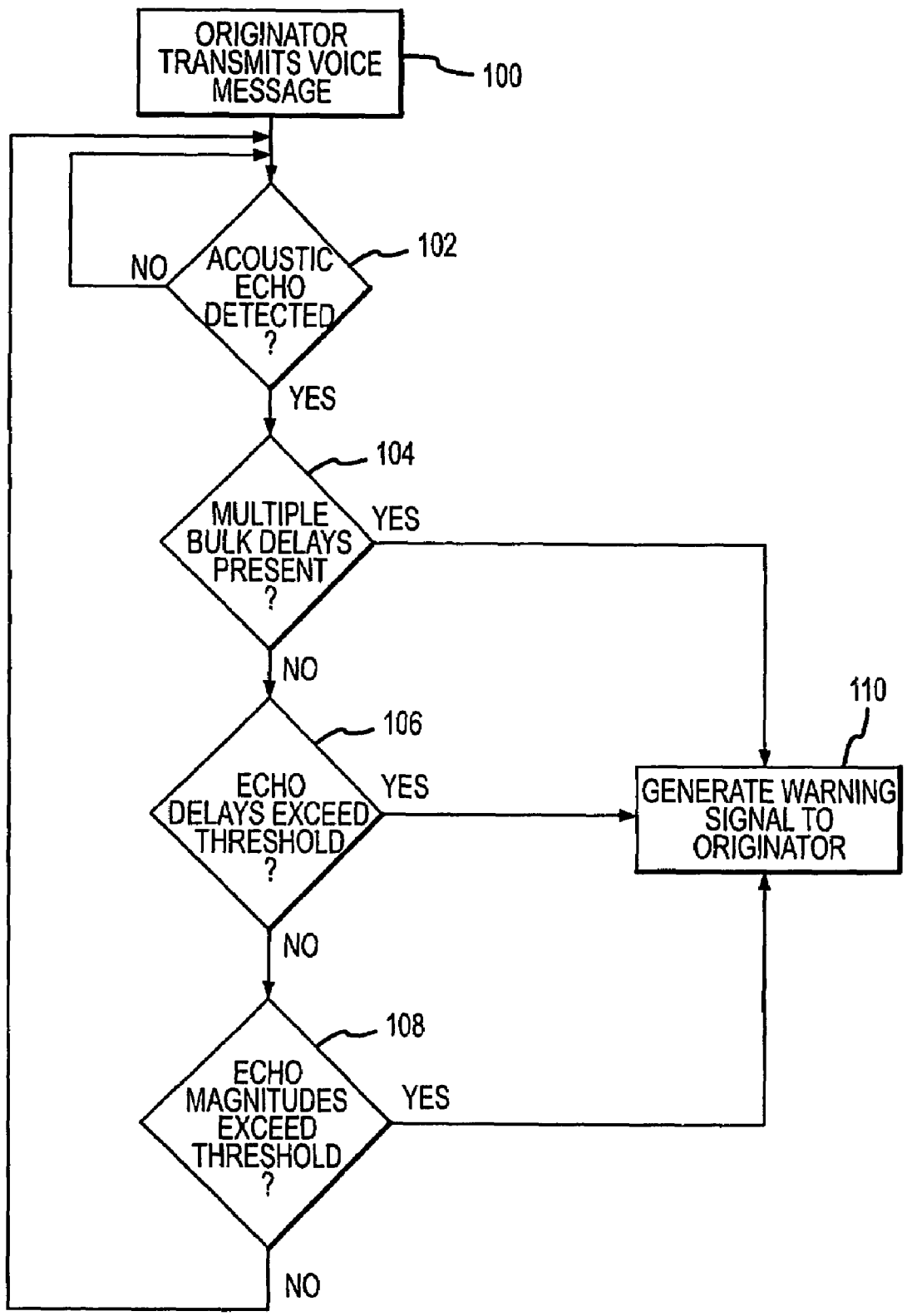
FIG. 3 is a flow chart depicting a method by which the echo discriminator may function to generate a warning signal to the user.

With reference now to FIG. 3, aspects of the operation of a system incorporating an echo discriminator 60 as described herein as illustrated within a flow diagram. Initially at step 100, the originator/user transmits a voice message over the communications network. At step 102, the echo discriminator 60 interrogates/accesses the memory of the echo detector 18 to determine whether an acoustic echo was detected. At this step, if no acoustic echo is detected, then no warning signal is generated to the user. If an acoustic echo is detected, then the echo discriminator analyzes the characteristics of the acoustic echoes present. Accordingly, at step 104, the echo discriminator determines whether multiple bulk delay values are present. If the quantity or frequency of the multiple bulk delay values exceed a threshold limit, then the echo discriminator generates the warning signal 66 to the user as shown at step 110. If multiple bulk delay values are not present in a sufficient quantity or frequency, then the echo discriminator at step 106 analyzes the time length of the delays. If the echo delays exceed predetermined threshold values, then this also results in the generation of a warning signal by the echo discriminator to the user. If the echo delays do not exceed the predetermined threshold limits, then the echo discriminator evaluates the echo magnitudes as shown at step 108, and if the echo magnitudes exceed threshold limits, then the echo discriminator generates the warning signal to the user. If the echo magnitudes do not exceed the threshold levels, then no warning signal would be provided to the user. It should be understood that steps 104, 106, and 108 may be performed in any sequence, and may also be performed simultaneously depending upon how the digital signal processor is programmed. Thus, FIG. 3 simply represents a general description of three primary factors or characteristics of acoustic echo signals that are evaluated by the echo discriminator 60 in determining whether a warning signal should be sent to the user.

As can be appreciated, there is no absolute way in which to detect the use of a speakerphone at a remote location by analyzing only the acoustic echoes which may be present in a transmitted voice signal; however, the present invention provides a very useful system and method by which a user may at least be warned of the high probability that a remote party is using a speakerphone.

The particular threshold limits set within the echo discriminator which trigger the generation of warning signal can be tuned to best fit a particular telecommunications system. For example, in communication networks that utilize voice over Internet protocol transmission techniques, transmission delays are typically greater than traditional public switched telephone networks. Accordingly, higher threshold limits may have to be established for voice over Internet protocol networks. Therefore, it is contemplated within the present invention that the various threshold limits that are programmed within the echo discriminator can be modified to best match the particular communication network in which the echo discriminator is employed.

The foregoing invention has been described with particular detail in reference to the preferred embodiment; however, various changes and modifications may be made to the invention that fall within the scope of the claims appended hereto.

We claim:

1. A method of detecting use of a speakerphone by a party engaging in a voice communication over a communication system, said method comprising the steps of:
   providing the communication system including a voice network, and at least two voice terminals connected to the voice network enabling voice communications to be conducted between users of the voice terminals;
   providing an echo detector in one of said voice network and said voice terminals for detecting hybrid and acoustic echoes generated in the communications system when voice communications are conducted;
   providing an echo discriminator in communication with said echo detector, said echo discriminator distinguishing between hybrid and acoustic echo present in the voice communications;
   conducting voice communications between the users of the voice terminals;
   detecting the presence of acoustic echo in the voice communications by said echo discriminator; and
   generating a warning signal to a far end user indicating that a near end user employs the use of a speakerphone.

2. A method, as claimed in claim 1, wherein:
   said detecting step includes the step of interfacing with said echo detector to retrieve signals indicative of the presence of acoustic echoes having multiple bulk delay values, and generating the warning signal if multiple bulk delays are present.

3. A method, as claimed in claim 1, wherein:
   said detecting step includes the step of interfacing with said echo detector to retrieve signals indicative of the presence of acoustic echoes having delay values exceeding a predetermined length of time, and generating the warning signal if echo delay values are present exceeding a threshold allowable predetermined length of time.

4. A method, as claimed in claim 1, wherein:
   said detecting step includes the step of interfacing with said echo detector to retrieve signals indicative of the presence of acoustic echoes having magnitudes exceeding a predetermined magnitude, and generating the warning signal if echo magnitudes are present exceeding a threshold predetermined magnitude.

5. A method, as claimed in claim 1, wherein:
   said detecting step includes the step of interfacing with said echo detector to retrieve signals indicative of the presence of acoustic echoes having multiple bulk delays, acoustic echoes having delay values exceeding a predetermined length of time, and acoustic echoes having magnitudes exceeding a predetermined magnitude, and generating the warning signal based upon evaluation of the presence of at least one of the multiple bulk delays, echo delay values exceeding a predetermined length of time, and echo magnitudes exceeding a predetermined magnitude.

6. A method, as claimed in claim 1, wherein:
   said warning signal includes an audible signal sent to the user.

7. A method, as claimed in claim 1, wherein:
   said warning signal includes a visual signal sent to the user.

8. A method, as claimed in claim 1, wherein:
   said warning signal includes an audible signal and a visual signal sent to the user.

9. A method, as claimed in claim 1, wherein:
   said warning signal includes a visual signal reporting the magnitude of the acoustic echo.

10. A method, as claimed in claim 1, wherein:
    said warning signal includes a visual signal reporting the length of the delay of the acoustic echo.

11. A method, as claimed in claim 1, wherein:
    said warning signal includes a visual signal reporting the presence of multiple bulk delays.

12. A system of detecting use of a speakerphone by a party engaging in a voice communication over a communication system, said system comprising:
    an electronic signal path operable to transmit electronic representations of voice signals between two voice terminals;

an echo detector incorporated in the system and operable to detect the presence of echoes associated with the electronic representations;

an echo discriminator communicating with said echo detector, said echo discriminator operable to distinguish between hybrid echoes and acoustic echoes present in the electronic representations, and said echo discriminator further having an operable to respond to detected acoustic echo for by producing an output signal to a far end user indicating the use of a speakerphone by a near end user.

13. A system, as claimed in claim 12, wherein:
said echo detector and said echo discriminator are incorporated within one of said voice terminals.

14. A system, as claimed in claim 12, wherein:
said echo detector and said echo discriminator are incorporated within a telephony switch of said communication system.

15. A system, as claimed in claim 12, wherein:
said echo detector is incorporated within a telephony switch of said communication system, and said echo discriminator is incorporated within one of said voice terminals.

16. A method of determining the presence of acoustic echo in a voice communication signifying a high likelihood of speakerphone use by a party to a voice communication, said method comprising the steps of:
receiving, by a telecommunication device, an electronic signal representative of a transmitted voice signal;
detecting, by an echo detector, an echo associated with the retrieved electronic signal;
discriminating, by an echo discriminator, between hybrid echo and acoustic echo if an echo is detected;
analyzing, by the echo discriminator, the characteristics of acoustic echo if acoustic echo is detected; and
outputting, by a telecommunication device, to a far end user an indication to a user that speakerphone use by a near end user has occurred based upon detected acoustic echo characteristics.

17. A method, as claimed in claim 16, wherein:
said analyzing step includes evaluation of the presence of characteristics including multiple bulk delay values, a length of time of echo delays, and echo magnitudes, and determining a threshold allowable value of at least one of said characteristics to prompt said outputting step if the allowable threshold value is exceeded.

18. A system for detecting acoustic echo in outgoing voice signals, said system comprising:
means for generating a first electronic signal representing a received voice signal;
means for detecting acoustic echo communicating with said means for generating, said means for detecting capable of generating a second electronic signal indicative of the presence of echo in the first electronic signal;
means for discriminating between hybrid and acoustic echo, said means for discriminating communicating with said means for detecting, said means for discriminating including programming means for evaluating the presence of discrete acoustic echo characteristics including multiple bulk delay values, a length of time of echo delays, and echo magnitudes; and
means for outputting a signal to a far end user indicating the presence of an acoustic echo, said acoustic echo produced as a result of use of speakerphone use by a near end user.

19. A system, as claimed in claim 18, wherein:
said means for generating comprises a microphone.

20. A system, as claimed in claim 18, wherein:
said means for detecting is provided as part of one of a communication server, communication gateway, or telephony switch.

21. A system, as claimed in claim 18, wherein:
said means for detecting is part of a voice terminal.

22. A system, as claimed in claim 18, wherein:
said voice terminal comprises a telephone.

* * * * *